US010337857B2

(12) United States Patent
Skoyles et al.

(10) Patent No.: US 10,337,857 B2
(45) Date of Patent: Jul. 2, 2019

(54) MULTI-SPECTRAL BORESIGHT ALIGNMENT METHODS AND SYSTEMS

(71) Applicant: RAYTHEON COMPANY, Waltham, MA (US)

(72) Inventors: Liam Skoyles, Allen, TX (US); Justin Martin, Anna, TX (US); Tyler Layne Hook, Little Elm, TX (US); Benjamin P. Lane, Garland, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/786,273

(22) Filed: Oct. 17, 2017

(65) Prior Publication Data

US 2019/0113337 A1    Apr. 18, 2019

(51) Int. Cl.
*G01B 11/27* (2006.01)
*G01J 1/02* (2006.01)
(Continued)

(52) U.S. Cl.
CPC .......... *G01B 11/272* (2013.01); *G01J 1/0266* (2013.01); *G01J 3/0208* (2013.01); *G01J 3/0229* (2013.01); *G01J 3/0237* (2013.01); *G01J 3/0289* (2013.01); *G01J 3/2823* (2013.01); *G01J 3/36* (2013.01)

(58) Field of Classification Search
CPC ..... G01B 11/272; G01J 1/0266; G01J 3/0208; G01J 3/0229; G01J 3/0237; G01J 3/0289; G01J 3/2823; G01J 3/36
See application file for complete search history.

(56) References Cited

U.S. PATENT DOCUMENTS 2,171,571 A    9/1939 Karnes
2,800,718 A    7/1957 Benford
(Continued)

FOREIGN PATENT DOCUMENTS

WO    9741460 A2    11/1997

OTHER PUBLICATIONS

Laveigne et al., "Non-optically Combined Multi-spectral Source for IR, Visible, and Laser Testing", Proceedings of SPIE (2010) vol. 7662, pp. 1-9.
(Continued)

Primary Examiner — Hina F Ayub
(74) Attorney, Agent, or Firm — Lando & Anastasi, LLP

(57) ABSTRACT

Aspects are generally directed to multi-sensor boresight alignment methods and systems for a multi-spectral reimaging optical system. In one example, a multi-sensor boresight alignment system includes a system interface to receive a first image frame from a first sensor and a second image frame from a second sensor, the first image frame having a contrast within a first spectral band and including a first image of a plate having a pattern of apertures, and the second image frame having a contrast within a second spectral band and including a second image of the plate. The system includes a field programmable gate array (FPGA) coupled to the system interface, the FPGA configured to spot track each image frame to identify a corresponding centroid of the pattern of apertures and correct an optical alignment between the first and second sensors based on a position of the corresponding centroids.

20 Claims, 8 Drawing Sheets

(51) Int. Cl.
*G01J 3/28* (2006.01)
*G01J 3/02* (2006.01)
*G01J 3/36* (2006.01)

(56) References Cited

U.S. PATENT DOCUMENTS

| | | |
|---|---|---|
| 3,371,212 A | 2/1968 | Weiss |
| 3,614,238 A | 10/1971 | Stites |
| 4,080,623 A | 3/1978 | Needs |
| 4,238,157 A | 12/1980 | Strauch et al. |
| 4,308,551 A | 12/1981 | Ohnuma et al. |
| 4,422,758 A | 12/1983 | Godfrey et al. |
| 4,811,061 A | 3/1989 | Sud et al. |
| 4,855,777 A | 8/1989 | Suda et al. |
| 4,902,128 A | 2/1990 | Siebecker et al. |
| 5,315,341 A | 5/1994 | Hibbard |
| 5,491,343 A | 2/1996 | Brooker |
| 5,900,942 A | 5/1999 | Spiering |
| 6,211,951 B1 | 4/2001 | Guch, Jr. |
| 6,239,912 B1 | 5/2001 | Ozawa |
| 6,765,663 B2 | 7/2004 | Byren et al. |
| 6,949,772 B2 | 9/2005 | Shimizu et al. |
| 8,934,097 B2 | 1/2015 | Rushford |
| 9,191,587 B2 * | 11/2015 | Wright ................... H04N 5/332 |
| 2003/0174315 A1 | 9/2003 | Byren et al. |
| 2004/0264626 A1 | 12/2004 | Besson |
| 2009/0309960 A1 | 12/2009 | Park et al. |
| 2012/0162757 A1 | 6/2012 | Roider et al. |
| 2013/0250123 A1 | 9/2013 | Zhang et al. |
| 2013/0314567 A1 | 11/2013 | McComas et al. |
| 2014/0021380 A1 * | 1/2014 | Sagan ..................... G01J 1/029 |
| | | 250/578.1 |
| 2014/0300751 A1 | 10/2014 | Orband |
| 2015/0054936 A1 | 2/2015 | Bach et al. |
| 2016/0305774 A1 | 10/2016 | Ross, Jr. et al. |
| 2017/0016768 A1 * | 1/2017 | Golub ................ H04N 5/23296 |
| 2017/0268928 A1 | 9/2017 | Chow et al. |
| 2018/0059212 A1 * | 3/2018 | Avitan ..................... F41G 3/323 |

OTHER PUBLICATIONS

Li et al., "A Multispectral Image Creating Method for a New Airborne Four-Camera System with Different Bandpass Fiters", Sensors (2015) vol. 15, pp. 17453-17469.

International Search Report and Written Opinion in application No. PCT/US2018/046414 dated Nov. 13, 2018.

St-Laurent et al. "Fast and accurate calibration-based thermal / colour sensors registration", 10th International Conference on Quantitative InfraRed Thermography (2010).

* cited by examiner

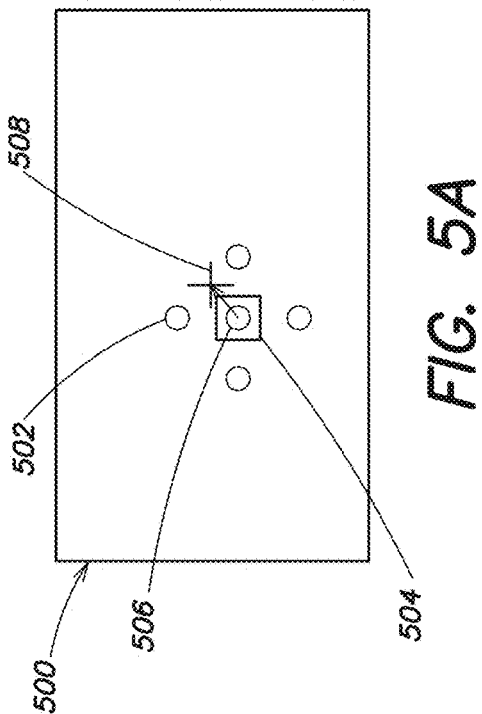
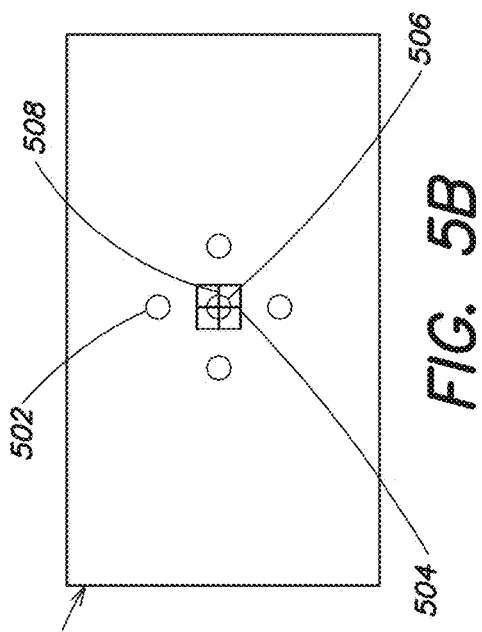
FIG. 5A
FIG. 5B
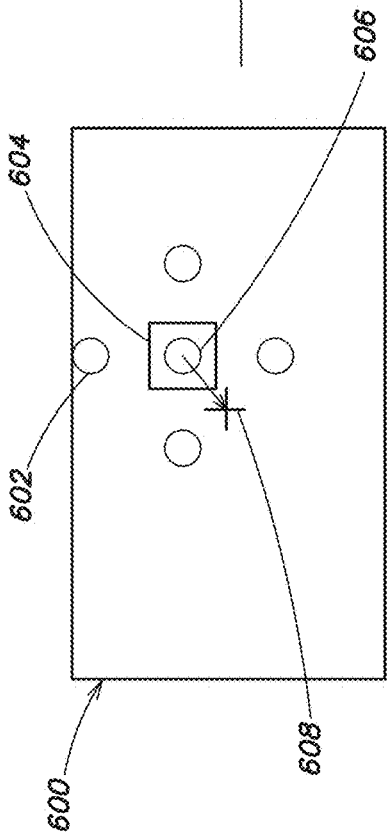
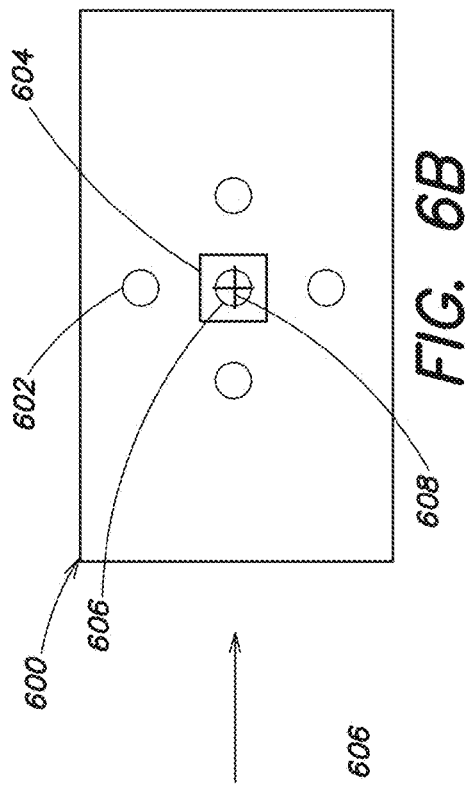
FIG. 6A
FIG. 6B

MULTI-SPECTRAL BORESIGHT ALIGNMENT METHODS AND SYSTEMS

BACKGROUND

Electro-optical systems are used in a variety of applications such as imaging, targeting, ranging, tracking, surveillance, and reconnaissance, among other military and civilian applications. In many of these systems, multiple imaging sensors sharing a common image plane each produce respective images of a viewed target or scene. In certain multi-spectral, electro-optical systems, different imaging sensors within the system are receptive to different spectral bands of electromagnetic radiation or light. These different spectral images allow an operator to detect and identify target characteristics that may otherwise be concealed when viewing the target in a single, narrower spectral band. Mutual alignment of the various imaging sensors within the system is necessary for ensuring that the fields of view (FOVs) of each respective sensor are aligned.

SUMMARY OF THE INVENTION

Aspects described herein are generally directed to multi-sensor boresight alignment methods for a multi-spectral reimaging optical system, and related multi-sensor boresight alignment systems. As discussed in further detail below, examples of the alignment systems receive multiple image frames from a plurality of respective imaging sensors, each image frame including an image of an alignment plate having a pattern of apertures formed in a surface of the alignment plate. Each image frame has an image contrast within a spectral band corresponding to the respective imaging sensor. In particular examples, the alignment system may rapidly track a position of a centroid of the pattern of apertures within each image. Based on the centroid position within each image, the alignment system is configured to correct an optical alignment between each respective sensor and/or correct an optical distortion. Particular examples of the alignment systems and methods described herein may be implemented by the on-board electronics (e.g., a field programmable gate array) of a reimaging optical system to permit alignment correction and/or distortion mapping and correction during the deployment of the reimaging optical system.

According to an aspect, provided is a multi-sensor boresight alignment method for a reimaging optical system. In one example, the method comprises receiving a first image frame from a first imaging sensor, the first image frame having an image contrast within a first spectral band and including a first image of a plate positioned at an intermediate image plane of the reimaging optical system, the plate having a pattern of apertures arranged in a surface thereof, spot tracking the first image frame to identify a first centroid of the pattern of apertures within the first image frame, receiving a second image frame from a second imaging sensor, the second image frame having an image contrast within a second spectral band and including a second image of the plate, spot tracking the second image frame to identify a second centroid of the pattern of apertures within the second image frame, and correcting an optical alignment between the first imaging sensor and the second imaging sensor based at least in part on a position of the first centroid within the first image frame and a position of the second centroid within the second image frame.

According to various examples, spot tracking the first image frame includes spot tracking a first subsection of the first image frame and spot tracking the second image frame includes spot tracking a second subsection of the second image frame. In some examples, each of the first centroid and the second centroid corresponds to a center aperture of the pattern of apertures, the center aperture being disposed at substantially a center of the plate. In various examples, spot tracking the first image frame to identify the first centroid includes comparing a light intensity level of at least one pixel of the first image frame to a light intensity level threshold to locate the center aperture within the first subsection, and spot tracking the second image frame to identify the second centroid includes comparing a light intensity level of at least one pixel of the second image frame to the light intensity level threshold to locate the center aperture within the second subsection. In various examples, spot tracking the first image frame to identify the first centroid includes locating the center aperture within the subsection frame based at least in part on a diameter of the center aperture relative to a diameter of the other apertures of the pattern of apertures, and spot tracking the second image frame to identify the second centroid includes locating the center aperture within the second subsection based at least in part on the diameter of the center aperture relative to the diameter of the other apertures of the pattern of apertures.

According to various examples, the method further comprises determining a first image center of the first image frame and a second image center of the second image frame. In some examples, correcting the optical alignment between the first imaging sensor and the second imaging sensor includes: reducing a first positional offset between the first image center of the first image frame and the first centroid, and reducing a second positional offset between the second image center of the second image frame and the second centroid.

In various examples, the first image frame is a first single image frame from a continuous first video image stream, and the second image frame is a second single image frame from a continuous second video image stream. In some examples, the method further comprises adjusting a field of view of the second imaging sensor to correspond to dimensions of the plate while spot tracking the first image frame. In various examples, the first spectral band is at least one of the visible and near-infrared (VNIR) spectral band and the short-wavelength infrared (SWIR) spectral band, and the second spectral band is at least one of the mid-wavelength infrared (MWIR) spectral band, the long-wavelength infrared (LWIR) spectral band, the very long wavelength infrared (VLWIR) spectral band, and the far infrared (FIR) spectral band.

According to an aspect, provided is a multi-sensor boresight alignment system. In one example, the multi-sensor boresight alignment system comprises a system interface component configured to receive a first image frame from a first imaging sensor and a second image frame from a second imaging sensor, the first image frame having an image contrast within a first spectral band and including a first image of a plate having a pattern of apertures arranged in a surface thereof, and the second image frame having an image contrast within a second spectral band and including a second image of the plate having the pattern of apertures, and at least one field programmable gate array coupled to the system interface component. The field programmable gate array may be configured to: spot track the first image frame to identify a first centroid of the pattern of apertures within the first image frame, spot track the second image frame to identify a second centroid of the pattern of apertures within the second image frame, and correct an optical alignment between the first imaging sensor and the second imaging sensor based at least in part on a position of the first centroid within the first image frame and a position of the second centroid within the second image frame.

In various examples, in spot tracking the first image frame the field programmable gate array is configured to spot track a first subsection of the first image frame, and in spot tracking the second image frame the field programmable gate array is configured to spot track a second subsection of the second image frame. In some examples, each of the first centroid and the second centroid corresponds to a center aperture of the pattern of apertures, the center aperture being disposed at substantially a center of the plate. According to various examples, the field programmable gate array is configured to compare a light intensity level of at least one pixel of the first image frame to a light intensity level threshold to locate the center aperture within the first subsection, and the field programmable gate array is configured to compare a light intensity level of at least one pixel of the second image frame to the light intensity level threshold to locate the center aperture within the second subsection.

According to various examples, the field programmable gate array is further configured to determine a first image center of the first image frame and a second image center of the second image frame. In some examples, in correcting the optical alignment between the first imaging sensor and the second imaging sensor the field programmable gate array is configured to: reduce a first positional offset between the first image center of the first image and the first centroid, and reduce a second positional offset between the second image center of the second image and the second centroid. In certain examples, the first image frame is a first single image frame from a continuous first video image stream, and the second image frame is a second single image frame from a continuous second video image stream.

In various examples, the multi-sensor boresight alignment system further comprises: the first imaging sensor, the first imaging sensor being configured to generate at least the first image frame having the image contrast within the first spectral band, where the first imaging sensor is positioned at a first focal plane, and the second imaging sensor, the second imaging sensor being configured to generate at least the second image frame having the image contrast within the second spectral band, where the second imaging sensor is positioned at a second focal plane. In some examples, the multi-sensor boresight alignment system further comprises at least one focusing optic interposed between the first imaging sensor and the intermediate image plane, and interposed between the second imaging sensor and the intermediate image plane, where the field programmable gate array is further configured to control the at least one focusing optic to adjust a field of view of the second imaging sensor to correspond to dimensions of the plate, while spot tracking the first image frame.

According to some examples, the first spectral band is at least one of the visible and near-infrared (VNIR) spectral band and the short-wavelength infrared (SWIR) spectral band, and the second spectral band is at least one of the mid-wavelength infrared (MWIR) spectral band, the long-wavelength infrared (LWIR) spectral band, the very long wavelength infrared (VLWIR) spectral band, and the far infrared (FIR) spectral band.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 5A and 5B are diagrams illustrating an image frame during one or more acts performed to align an image center and a centroid, according to various examples described herein;

FIGS. 6A and 6B are diagrams illustrating another image frame during one or more acts performed to align an image center and a centroid, according to various examples described herein.

DETAILED DESCRIPTION

Figure 1:
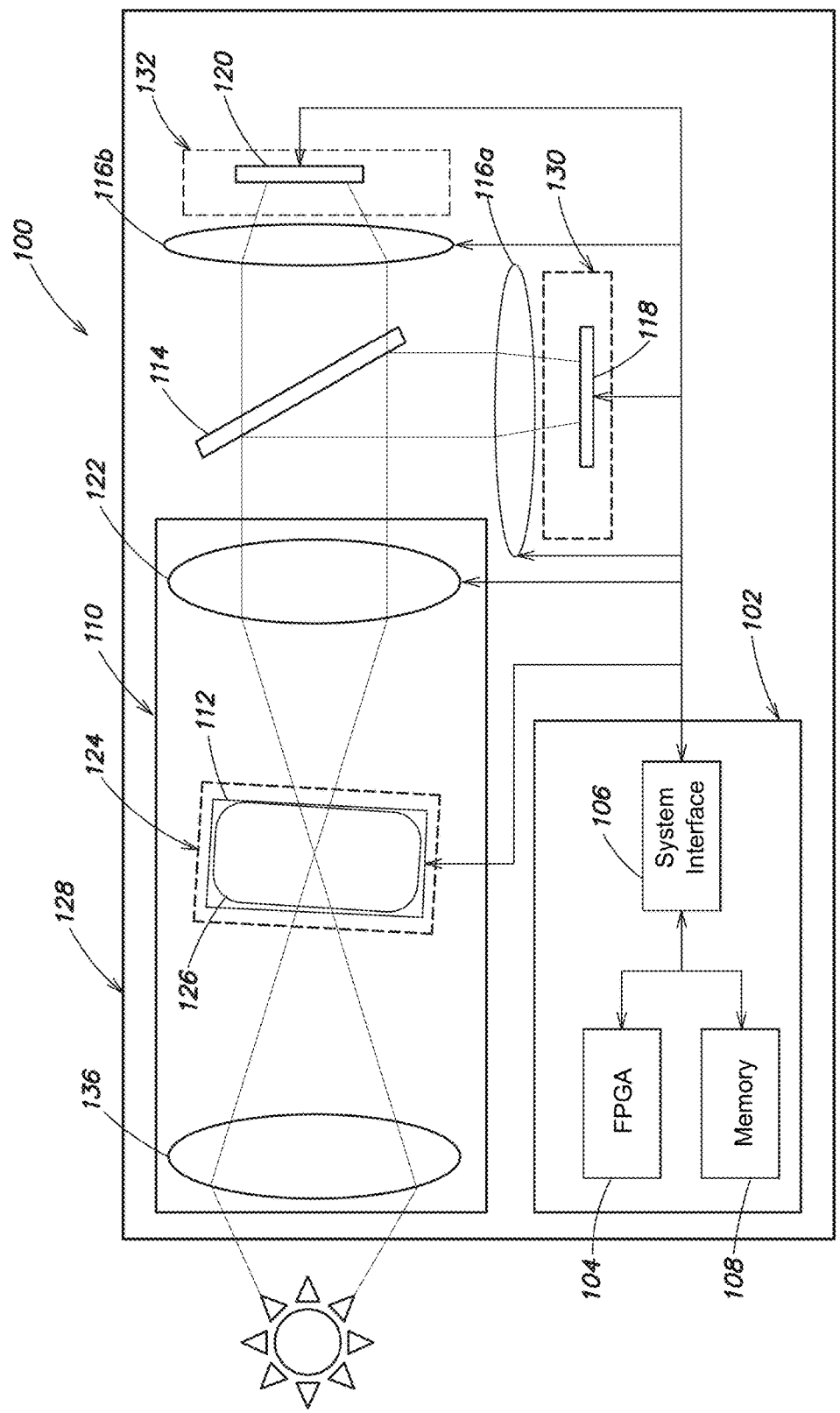
FIG. 1 is a block diagram of a multi-spectral reimaging optical system that includes an alignment system, according to various examples described herein.

Aspects described herein are generally directed to multi-sensor boresight alignment methods for a reimaging optical system, and related multi-sensor boresight alignment systems. As further described herein, particular examples of the alignment systems and methods correct misalignments between imaging sensors of a multi-spectral reimaging optical system and/or correct an optical distortion, in real-time during deployment of the reimaging optical system.

As discussed above, mutual alignment of the various imaging sensors within a multi-spectral electro-optical system is necessary for ensuring that the fields of view (FOVs) of each respective sensor are properly aligned. Even slight misalignments between the imaging sensors can result in undesirable effects, such as targeting inaccuracy and navigational imprecision. Current techniques for the correction of optical misalignments rely on specialized test hardware that is external to the optical system, and, accordingly, time consuming and inefficient to operate. For instance, some techniques require the disassembly of the optical system within a lab environment. Similar deficiencies exist in current techniques for distortion correction.

Each optical path within a multi-spectral electro-optical system often has a relative level of optical distortion. Optical distortions can result from the surface characteristics of the one or more optical elements within the optical system. Similar to typical techniques for alignment correction, typical techniques for correcting optical distortions within a multi-spectral electro-optical system often rely on external optical test equipment that is time consuming and inefficient to operate. For example, some techniques include placing the optical system in front of a collimator to simulate far field behavior, slewing a target around a field of view of the optical system, and measuring the locations of the target with each sensor of the optical system. Accordingly, real-time implementation of these techniques during the deployment of the optical system is unfeasible.

Accordingly, various examples of the multi-spectral boresight alignment systems and methods described herein provide for rapid real-time optical sensor alignment correction and/or distortion correction. Particular examples of the described alignment system may be self-contained within a multi-spectral electro-optical system to permit rapid real-time optical sensor alignment correction and/or distortion correction during the deployment of the associated multi-spectral electro-optical system. Accordingly, various aspects and embodiments of the multi-spectral boresight alignment systems and methods described herein provide sensor alignment and distortion correction functionality that is not currently offered by existing optical devices and imaging techniques. Various other advantages and benefits of the discussed multi-spectral boresight alignment systems and methods are discussed below with reference to the drawings.

It is to be appreciated that embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, illustrated is one example of a multi-sensor boresight alignment system ("alignment system") 102 incorporated within a multi-spectral reimaging optical system ("reimaging optical system") 100. As shown, the alignment system 102 may include at least one field programmable gate array (FPGA) 104, a system interface 106, and a memory 108, among other hardware and/or software components. As also shown in FIG. 1, the reimaging optical system 100 may include reimaging foreoptics 110, a multi-spectral alignment assembly 112, an optical beamsteering device 114, one or more focusing optics 116a, 116b, and a plurality of imaging sensors (e.g., first imaging sensor 118 and second imaging sensor 120). The reimaging foreoptics 110 are shown as including a front objective 136, one or more reimaging optical elements 122, and an intermediate image plane 124 (shown as a ghost box). In FIG. 1, the alignment assembly 112 is disposed in an engaged position during which an alignment plate 126 of the alignment assembly 112 is positioned at the intermediate image plane 124. The reimaging foreoptics 110, alignment system 102, alignment assembly 112, and other components of the reimaging optical system 100 may be enclosed within a housing or protective casing 128.

While the alignment system 112 is shown as being incorporated within one particular multi-spectral reimaging optical system, it is appreciated that in various other examples the alignment system 112 may be incorporated within multi-spectral reimaging systems having optical components and/or optical arrangements other than that of the illustrated example. For instance, while the illustrated optical system 100 is shown as including afocal foreoptics (e.g., the front objective 136 and reimaging optical element 122), in alternative implementations the reimaging foreoptics 110 are not necessarily afocal.

Incident electromagnetic radiation from a distant target or "scene" is received and manipulated by the reimaging foreoptics 110 so as to produce an image at the intermediate image plane 124. In various examples, electromagnetic radiation received by the reimaging foreoptics 110 enters through the front objective 136 of the reimaging optical system 100. The front objective 136 may include one or more optical elements, such as one or more objective mirrors or objective lenses. In one implementation, the front objective 136 receives the electromagnetic radiation and focuses the electromagnetic radiation onto the intermediate image plane 124. However, in other examples additional optical elements may receive the electromagnetic radiation from the front objective 136 and may form an image at the intermediate image plane 124. In one implementation, the reimaging optical element 122 is configured to substantially reimage the received electromagnetic radiation from the intermediate image plane 124 and generate an output optical beam. In various embodiments, the optical beam is directed to each of the plurality of imaging sensors (e.g., the first imaging sensor 118 and the second imaging sensor 120). The reimaging optical element 122 may include one or more mirrors or lenses, such as collimating mirrors or lens.

As discussed herein, the intermediate image plane 124 is formed between the front objective 136 and the reimaging optical element 122 of the reimaging foreoptics 110. Notably, the intermediate image plane 124 is upstream from each imaging sensor (e.g., the illustrated first imaging sensor 118 and the second imaging sensor 120) of the reimaging optical system 100. Accordingly, when the alignment plate 126 of the alignment assembly 112 is positioned at the intermediate image plane 124 (i.e., the alignment assembly 112 is in the engaged position), the alignment plate 126 is viewable by each of the first imaging sensor 118 and the second imaging sensor 120. While in some examples, the alignment plate 126 may be simultaneously viewable by each imaging sensor 118, 120 when positioned at the intermediate image plane 124, in various other examples, one or more adjustments to the field of view or focus of the first imaging sensor 118 or second imaging sensor 120 may be necessary to bring the alignment plate 126 within the respective field of view.

As discussed, the reimaging optical system 100 may include an alignment assembly 112 having an alignment plate 126 (also referred to herein as the "plate"). The reimaging optical system 100 may include an actuator system (not shown) that is coupled to at least the alignment plate 126 and configured to move the alignment assembly 112 between an engaged position and a disengaged position. When in the engaged position, the alignment plate 126 is positioned at, or substantially at, the intermediate image plane 124. When in the disengaged position, the alignment plate 126 is removed from the intermediate image plane 124. That is, when the alignment assembly 112 is in the disengaged position, the alignment plate 126 is no longer viewable to the first imaging sensor 118 and the second imaging sensor 120. Accordingly, the alignment plate may be selectively positioned at the intermediate image plane 124 to perform one or more alignment operations, and removed after those operations are complete. As used herein, the intermediate image plane 124 is not defined as a discrete point and may include, for example, the area immediately proximate the image plane as defined by geometric optics.

As further described below with reference to at least FIGS. 2A-2E, in various examples the alignment plate 126 may include a pattern of apertures formed in a surface thereof. Specifically, the pattern of apertures may be formed in a surface of the alignment plate 126 that is viewable to the imaging sensors 118, 120 of the reimaging optical system 100 when the alignment plate 126 is positioned at the intermediate image plane 124. Images of the alignment plate 126, as provided by each imaging sensor 118, 120 of the reimaging optical system 100, may be used in one or more of the processes for correcting misalignments between the imaging sensors 118, 120 and/or correcting an optical distortion.

In certain examples, the alignment assembly 112 further includes a source of optical illumination and a source of thermal radiation (not shown in FIG. 1). The source of optical illumination may be positioned in the image space of the reimaging foreoptics 110 and arranged such that optical illumination from the source of optical illumination is directed at the alignment plate 126 when the alignment plate is positioned at the intermediate image plane 124. Specifically, the source of optical illumination may direct optical illumination at the surface of the alignment plate 126 that is viewable to the first imaging sensor 118 and second imaging sensor 120 (e.g., the surface having the pattern of aperture formed therein). The surface of the alignment plate 126 reflects the optical illumination in a direction of the reimaging optical element 122 and the imaging sensors 118, 120. In various examples, the reflections of the optical illumination from the reflecting surface of the alignment plate 126 may be imaged by the first imaging sensor 118 and/or second imaging sensor 120. The source of optical illumination may include a light emitting diode (LED), or other source of optical infrared illumination.

In various examples, the source of thermal radiation includes a heating element coupled to a thermal emissive plate. The thermal emissive plate may be positioned proximate the alignment plate 126 so as to form a gap therebetween. Accordingly, when the alignment plate 126 is positioned at, or substantially at, the intermediate image plane 124, the thermal emissive plate is also positioned proximate the intermediate image plane 124. The heating element is configured to heat the thermal emissive plate such that the thermal emissive plate radiates thermal radiation into the gap between the alignment plate 126 and the thermal emissive plate. Accordingly, thermal radiation emitted into the gap, and transmitted through the plurality of apertures in the alignment plate 126, may be directed to the reimaging optical element 122 and the imaging sensors 118, 120. One or both of the imaging sensors 118, 120 may receive the thermal radiation and generate an image based on the thermal emissivity difference between the alignment plate 126 and the thermal emissive plate.

Accordingly, in various examples the alignment plate 126, when positioned at the intermediate image plane 124, is viewable across a wide spectral range of the electromagnetic spectrum. For instance, in various examples the alignment plate 126 may be imaged in both the thermal regions and optical regions of the infrared spectrum. Specifically, the reflected optical radiation may include optical infrared illumination, and the thermal radiation may include thermal infrared radiation.

Selectively positioning the alignment plate 126 within the reimaging foreoptics 110 and upstream from the imaging sensors 118, 120 enables the reimaging optical system 100 to rapidly and efficiently insert and remove the alignment plate 126 from the intermediate image plane 124 with minimal interference to other system components. Deployment or retraction of the alignment plate 126 may occur at any time during operation of the reimaging optical system 100. Accordingly, in various examples the alignment system 102 may repeatedly perform one or more alignment processes or distortion correction processes to accommodate for fluctuations in environmental influences during the deployment of the reimaging optical system 100.

As discussed, in various examples, the reimaging foreoptics 110 includes at least one reimaging optical element 122. The reimaging optical element 122 is positioned to receive the reflections of the optical illumination from the alignment plate 126, as well as, the thermal radiation transmitted through the apertures of the alignment plate 126. The reimaging optical element 122 may transmit or reflect the received optical illumination and/or thermal radiation to the beamsteering device 114. The beamsteering device 114 may include a dichroic beamsplitter, or other beam splitting device, and may be used to separate and direct the optical illumination and thermal radiation to the first imaging sensor 118 and the second imaging sensor 120. That is, the dichroic beamsplitter may split electromagnetic radiation received from the intermediate focal plane 124 as a function of the wavelengths of the electromagnetic radiation received. In implementations in which the reimaging optical system 100 includes more than two imaging sensors, additional beamsteering devices may be included to split the received optical illumination and thermal radiation into more than two spectral bands.

As illustrated in FIG. 1, the reimaging optical system 100 may also include one or more focusing optics 116a, 116b. FIG. 1 shows the reimaging optical system 100 including a first focusing optic 116a interposed between the beamsteering device 114 and the first imaging sensor 118, and a second focusing optic 116b interposed between the beamsteering device 114 and the second imaging sensor 120. In various examples, the beamsteering device 114 is configured to direct the optical illumination to one of the first focusing optic 116a and the second focusing optic 116b, and direct the thermal radiation to the other of the first focusing optic 116a and the second focusing optic 116b. For example, the optical illumination may be reflected or transmitted to the first focusing optic 116a and the thermal radiation may be transmitted or reflected to the second focusing optic 116b. Each focusing optic 116a, 116b may focus the received energy onto a respective focal plane (e.g., a first focal plane 130 and a second focal plane 132). In particular, the first focusing optic 116a may focus the optical illumination onto the first focal plane 130, and the second focusing optic 116b may focus the thermal radiation onto the second focal plane 132.

The imaging sensors 118, 120 are each positioned at a respective focal plane 130, 132 and configured to produce an image or video stream of the alignment plate 126 based on the received optical illumination or thermal radiation. For instance, the first imaging sensor 118 may be positioned at the first focal plane 130 and configured to generate at least a first image frame within a first spectral band corresponding to optical illumination. The second imaging sensor 120 may be positioned at the second focal plane 132 and configured to generate at least a second image frame within the second spectral band corresponding to the thermal radiation. That is, each imaging sensor 118, 120 may be responsive to a different spectral band of the infrared spectrum, and may generate an image or video stream responsive to receipt of electromagnetic radiation within that respective spectral band.

In particular examples, the first imaging sensor 118 may detect infrared radiation within the near-infrared (VNIR) spectral band, the short-wavelength infrared (SWIR) spectral band, or both the VNIR spectral band and the SWIR spectral band. The second imaging sensor 120 may detect infrared radiation within the mid-wavelength infrared (MWIR) spectral band, the long-wavelength infrared (LWIR) spectral band, the very long wavelength infrared (VLWIR) spectral band, and the far infrared (FIR) spectral band, or any combination thereof. Each imaging sensor 118, 120 may include a detector array, such as focal plane array comprised of a grid array of detector elements (e.g., pixels) arranged in rows and columns. In various examples, each imaging sensor 118, 120 may include a complementary metal-oxide semiconductor (CMOS) based sensor or a charge coupled device (CCD). While illustrated as including two imaging sensors, in various other examples the reimaging optical system 100 may include more than two imaging sensors.

In certain examples, the one or more mirrors or lenses, such as the first focusing optic 116a and the second focusing optic 116b, are controllable to adjust a field of view or focus of the first imaging sensor 118 and the second imaging sensor 120. For instance, the first focusing optic 116a may be controlled to adjust a field of view of the first imaging sensor 118, and the second focusing optic 116b may be controlled to adjust a field of view of the second imaging sensor 120. As further described herein, in various implementations, the first focusing optic 116a may be configured to adjust a field of view of the first imaging sensor 118 to correspond to the dimensions of the alignment plate 126, and the second focusing optic 116b may be configured to adjust a field of view of the second imaging sensor 120 to correspond to the dimensions of the alignment plate 126. That is, the field of view of the first imaging sensor 118 and the field of view of the second imaging sensor 120 may be adjusted such that the entire alignment plate 126 is within the respective field of view, when the alignment plate 126 is positioned at the intermediate image plane 124.

As discussed above, various examples of the alignment system 100 described herein are configured to correct an optical alignment between each of the imaging sensors 118, 120 and/or an optical distortion of each of the imaging sensors 118, 120. In certain examples, such actions are performed by the components of the alignment system 102. As shown, the alignment system 102 may include a memory 108, a system interface 106, and a field programmable gate array (FPGA) 104, among other components not explicitly illustrated in FIG. 1. Each of the memory 108, system interface 106, and the FPGA 104 may be coupled by an interconnection element such as a bus or other connection for exchanging data and/or instructions. The bus may include one or more physical busses and may include any communication coupling between system components including specialized or standard computing bus technologies. Thus, the bus enables communications (for example, data and instructions) to be exchanged between components of the alignment system 102.

As illustrated in FIG. 1, the system interface 106 may be configured to receive an image frame or a series of image frames (e.g., video stream) from each imaging sensor 118, 120 of the reimaging optical system 100. Each image frame may correspond to an image formed at the intermediate image plane 124. In FIG. 1, the system interface 106 is shown as being coupled to the first imaging sensor 118 to receive a first image frame from the first imaging sensor 118, and coupled to the second imaging sensor 120 to receive a second image frame from the second imaging sensor 120. The system interface 106 may include one or more hardware devices or software modules, such as input devices, one or more output devices, or a combination of input and output devices.

In particular examples, the system interface 106 receives a first image frame having an image contrast within a first spectral band and including a first image of the alignment plate 126 deployed at the intermediate image plane. As described, the image may include the pattern of apertures formed in the surface of the alignment plate 126. Similarly, the system interface 106 is configured to receive a second image frame having an image contrast within a second spectral band and including a second image of the alignment plate 126 deployed at the intermediate image plane 124. In one example, the first spectral band and the second spectral band are non-overlapping, and each correspond to the range of detectable wavelengths of each respective imaging sensor 118, 120. For example, where the second imaging sensor 120 detects wavelengths within the MWIR spectral band, FIR spectral band, VLWIR spectral band, and/or the LWIR spectral band, the second image contrast is within the MWIR spectral band, FIR spectral band, VLWIR spectral band, and/or the LWIR spectral band. Similarly, where the first imaging sensor 118 detects wavelengths within the VNIR spectral band and/or the SWIR spectral band, the first image contrast is within the VNIR spectral band and/or the SWIR spectral band.

Figure 2B:
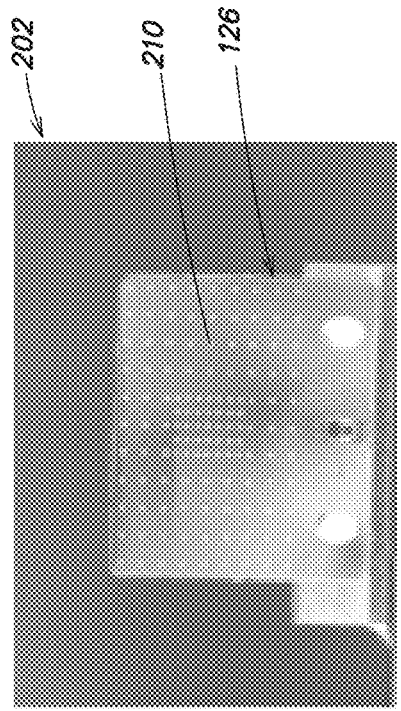
FIGS. 2A-2E are image frames that include an image of an alignment plate, according to various examples described herein.
Figure 2D:
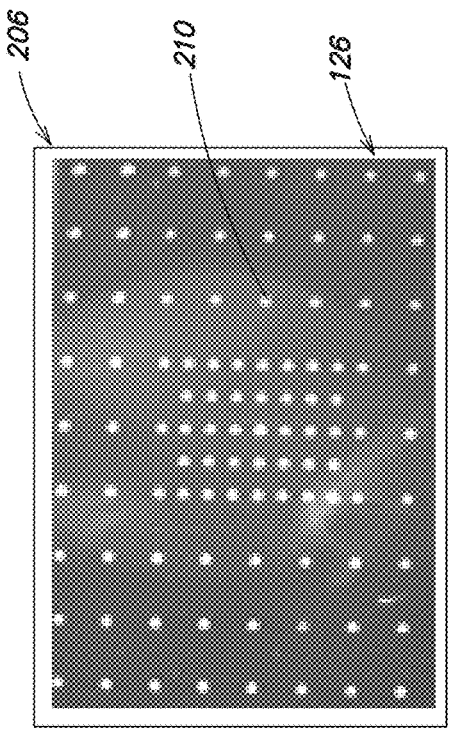
Figure 2A:
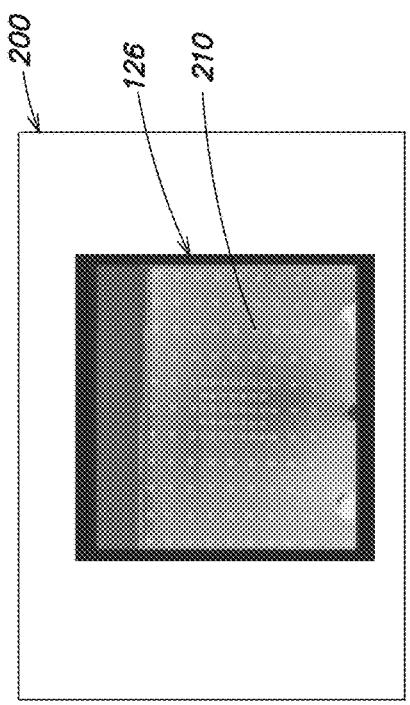
Figure 2C:
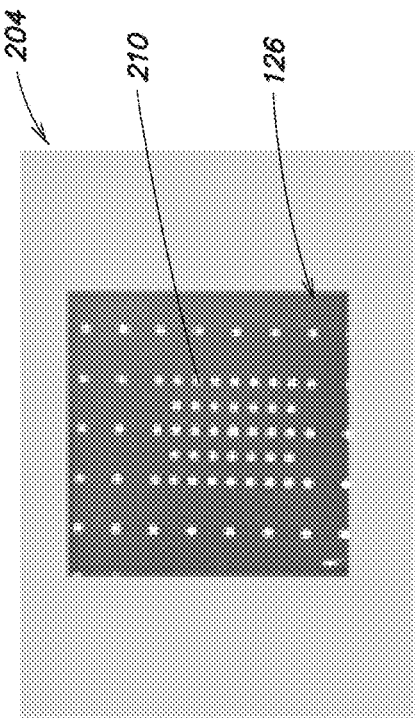

Turning briefly to FIGS. 2A-2D, illustrated are various examples of image frames that may be collected by the one or more imaging sensors of the reimaging optical system 100. For instance, FIG. 2A is an image frame 200 that has a contrast within the LWIR spectral band, FIG. 2B is an image frame 202 that has an image contrast within the MWIR spectral band, FIG. 2C is an image frame 204 that has a contrast within the SWIR spectral band, and FIG. 2D is an image frame 206 that has a contrast within the VNIR spectral band. In various examples the image frames 200, 202 of FIGS. 2A and 2B may be generated by the second imaging sensor 120 based on the thermal radiation, and the image frames 204, 206 of FIGS. 2C and 2D may be generated by the first imaging sensor 118 based on the reflected optical illumination. As illustrated in FIGS. 2A-2D, each image frame 200, 202, 204, 206 includes an image of the alignment plate 126 and the apertures 210 formed in the reflective surface of the alignment plate 126.

Referring again to FIG. 1, the system interface 106 may be coupled to the FPGA 104 and the memory 108. In various examples, the memory 108 is configured to store instructions and/or data during the operation of the alignment system 102. For example the memory 108 may store the image frame(s) provided by the first imaging sensor 118 and/or the second imaging sensor 120. The memory 108 may be a relatively high performance, volatile, random access memory, such as dynamic random access memory (DRAM) or static memory (SRAM). However, in certain other examples the memory 108 may include any device for storing data and/or instructions such as non-volatile data storage (e.g., flash memory or phase-change memory (PCM)). Instructions stored in the memory 108 may be executed by the FPGA 104. For instance, the memory 108 may include a set of software instructions that define a program to be executed by the FPGA 104 to spot track the first image frame, spot track the second image frame, and correct an optical alignment between the first imaging sensor 118 and the second imaging sensor 120, or correct an optical distortion of the first imaging sensor 118 or the second imaging sensor 120. The instructions may be persistently stored as encoded signals, and the instructions may cause the FPGA 104 to perform any of the acts, steps, or functions described herein.

While not explicitly illustrated in FIG. 1, in certain examples, the alignment system 102 may further include non-transitory data storage, such as a writeable and readable non-volatile storage medium. The non-volatile storage medium may also store the software instructions and or the data. In operation, the FPGA 104 may cause the software instructions and/or data to be read from the non-volatile recording medium into another memory, such as the memory 108, that allows for faster access to the instructions and data. The storage medium may include, for example, an optical disk, a magnetic disk, or flash memory, among other examples. The FPGA 104 may manipulate the data within the memory, and then copy the data to the storage medium after processing is complete.

As shown, the FPGA 104 is coupled to the system interface 104 and the memory 108. In various examples the FPGA 104 includes an array of programmable logic blocks (including logical cells) that are specified to perform the various steps, acts, and functions described herein. For instance, the programmable logic blocks may be interconnected with various logic gates. While shown in FIG. 1 as being separate from the FPGA 104, it is appreciated that in various examples the memory may be incorporated within the FPGA 104. For instance, the memory 108 may be implemented as one or more RAM blocks within the FPGA 104. In certain other examples, the FPGA 104 may include a non-volatile memory module and/or a combination of non-volatile memory components and volatile memory components. The FPGA 104 may be designed in a hardware description language (HDL) such as VHDL or Verilog or any other language utilized for FPGA development. In various other examples, the alignment system 102 may include an application specific integrated circuit (ASIC) instead of the FPGA 104.

In various examples, the FPGA 104 is configured to spot track a first image frame (e.g., an image frame provided by the first imaging sensor 118) to identify a centroid of the pattern of apertures within the first image frame, and spot track a second image frame (e.g., an image frame provided by the second imaging sensor 120) to identify a second centroid of the pattern of apertures within the second image frame. While in one example the FPGA 104 may spot track the entire first image frame or the entire second image frame in certain other examples, the FPGA 104 may be configured to spot track a subsection of the first image frame or a subsection of the second image frame. As described herein, in various examples "spot tracking" includes searching a span of an image frame, or a span of a subsection of the image frame, to locate a position of the centroid within that image frame, or that subsection of the image frame. It is appreciated that executing spot tracking instructions at the FPGA 104 integrated within the reimaging optical system 100 significantly decreases the processing time necessary to align one or more imaging sensors or image frames, when compared to typical alignment techniques. For instance, the dedicated logic of the FPGA 104 may accelerate spot tracking operations to less than one image frame of latency. In particular, the hardware accelerated methods described herein may iterate on a subsection of an image frame in less than 350 μs, using a 200 MHz pixel clock. Such an implementation is orders of magnitude faster than current techniques.

Figure 2E:
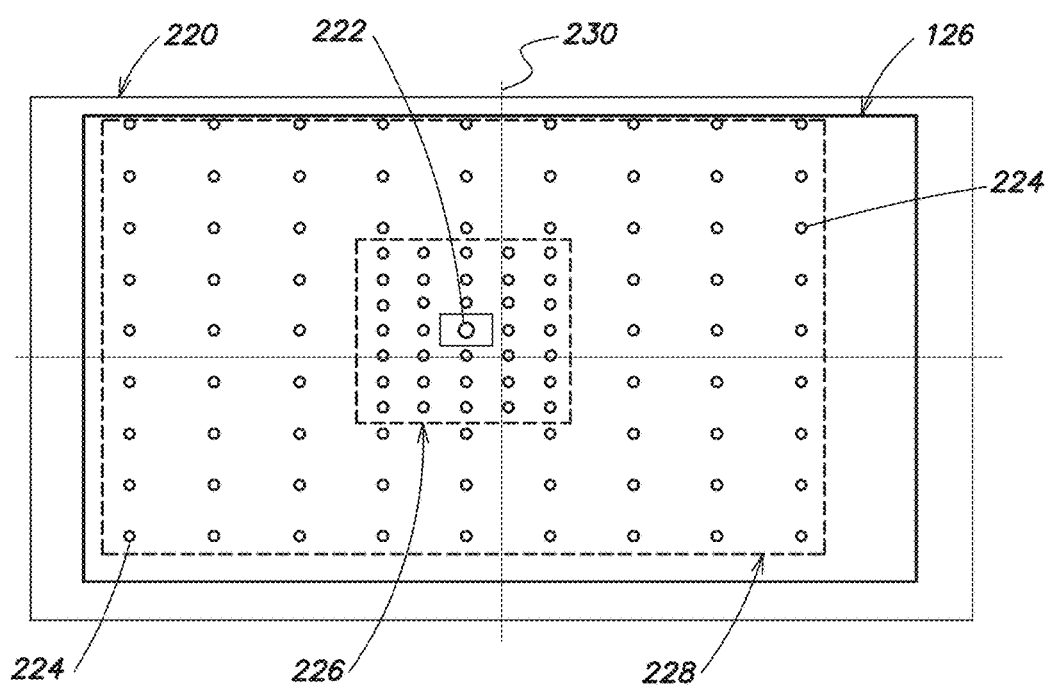

Referring to FIG. 2E, illustrated is another example of an image frame 220. For instance, similar to the image frame 204 of FIG. 2C, the image frame 220 of FIG. 2E may have an image contrast within the SWIR spectral band. As shown, the image frame 220 includes an image of the alignment plate 126 and the apertures 224 formed within the surface of the alignment plate 126. In particular, the apertures 224 may be arranged in a pattern that includes a center aperture 222 positioned at about a center of the alignment plate 126. The remaining apertures 224 may be disposed about the surface of the plate 126 in one or more regular patterns. For instance, the pattern of apertures 224 shown in the image frame 220 includes a first subsection of apertures 224 arranged in first pattern 226 in close proximity to center aperture 222, and a second subsection of apertures 224 arranged in a second pattern 228 at a distance from the center aperture 222.

Specifically, the first pattern 226 of apertures 224 includes seven rows and five columns of apertures 224 arranged in a grid pattern about the center aperture 222 with a first spacing between each aperture 224. The second pattern 228 of apertures 224 includes nine rows and nine columns of apertures 224 also centered about the center aperture 222 with a second spacing between each aperture 224. Accordingly, the first pattern 226 of apertures 224 is also positioned at about the center of the second pattern 228. In various examples, the first spacing between each aperture 224 of the first pattern 226 is about half of the second spacing between each aperture 224 of the second pattern 228. Accordingly, the first subset of apertures 224 arranged in the first pattern 226 has a higher density of apertures 224 than the second subset of apertures 224 arranged in the second pattern 228. Each aperture 224 of the first pattern 226 and second pattern 228 has a circular shape and a common diameter. However, as shown in FIG. 2E, in certain examples, the center aperture 222 may have a diameter slightly larger than the other apertures 224. For instance, the center aperture 22 may be 10% to 50% larger than the other apertures 224. While in the illustrated example, the apertures 224 of the first subset and the second subset are each arranged in a regular rectilinear pattern, in various other examples other regular or irregular patterns may be used.

Referring to FIG. 1, as further described below, to spot track the first image frame and the second image frame the FPGA 104 may correlate a pixel light intensity level with a light intensity level threshold (or value) to locate a position of the center aperture (e.g., center aperture 222 shown in FIG. 2E). As discussed, in many examples the center aperture has a diameter that is different from the other apertures of the plurality of apertures. Accordingly, a pixel light intensity level of a pixel that corresponds to the center aperture will be different from the pixel light intensity levels corresponding to the other areas of the image frame. That is, a pixel light intensity level within the first image frame and the second image frame will be higher (e.g., brighter) at the location of the center aperture. Accordingly, the FPGA 104 may identify the centroid in the first image frame and/or the second image frame by comparing the light intensity level of each pixel within the first image frame and/or the second image frame to a threshold that is set at a level that distinguishes between an expected pixel light intensity level of a pixel corresponding to the center aperture, and expected pixel light intensity levels corresponding to the other pixels. That is, the centroid may be identified by locating the center aperture based on the pixel light intensity levels within the first image frame.

In certain other examples, the FPGA 104 may identify the centroid in the first image frame and/or the centroid in the second image frame by locating a position of the center aperture based on a diameter of the center aperture. That is, in various examples, the FPGA 104 may scan the first image frame and/or the second image frame to locate the aperture that has a diameter different from the other apertures. In various examples, once the center aperture of the plurality of apertures has been located, the centroid of the pattern of apertures (in the first image frame and/or second image frame) is set to the position of the center aperture. Further examples of processes for locating the centroid of the pattern of apertures in one or more image frames are further described below with reference to at least FIGS. 2-3.

Once the centroids within the first image frame and the second image frame have been identified, the FPGA 104 is configured to correct an optical alignment between the first imaging sensor 118 and the second imaging sensor 120 based on the locations of the identified centroids. Such acts may include determining a positional offset between an image center of the image frame and the position of the centroid, and re-positioning the image center at the location of the centroid to reduce the positional offset. In FIG. 2E, an image center of the image frame 220 is represented by the cross-hairs 230.

In various examples, the image center may be determined based on the dimensions of the image frame. To reduce the positional offset between the image center and the location of the centroid, the alignment system 102 may generate one or more control signals to adjust a position of the first imaging sensor 118 or a position of one or more optics of the reimaging optical system 100. For instance, the FPGA 104 may generate one or more signals to adjust a position of the reimaging optical element 122 and/or the focusing optics 116*a*, 116*b*. In other examples, the FPGA 104 may perform one or more image processing operations (e.g., pixel substitution) to reduce a pixel offset between the centroid and image center. Such operations may be performed by the FPGA 104 with respect to both the first image frame and the second frame.

In other examples, the FPGA 104 is configured to correct an optical alignment between the first imaging sensor 118 and the second imaging sensor 120 by aligning the centroid of the first image frame to the centroid of the second image frame, or aligning the centroid of the second image frame to the centroid of the first image frame. That is, in various examples the FPGA 104 may align the first image frame to the second image frame (or vice versa) based on the locations of the respective centroids. Various other acts, steps, and functions performed by the FPGA 104 to correct the alignment between the first imaging sensor 118 and the second imaging sensor 120 are described below with reference to at least FIG. 3 and FIG. 7A-7B.

Figure 3:
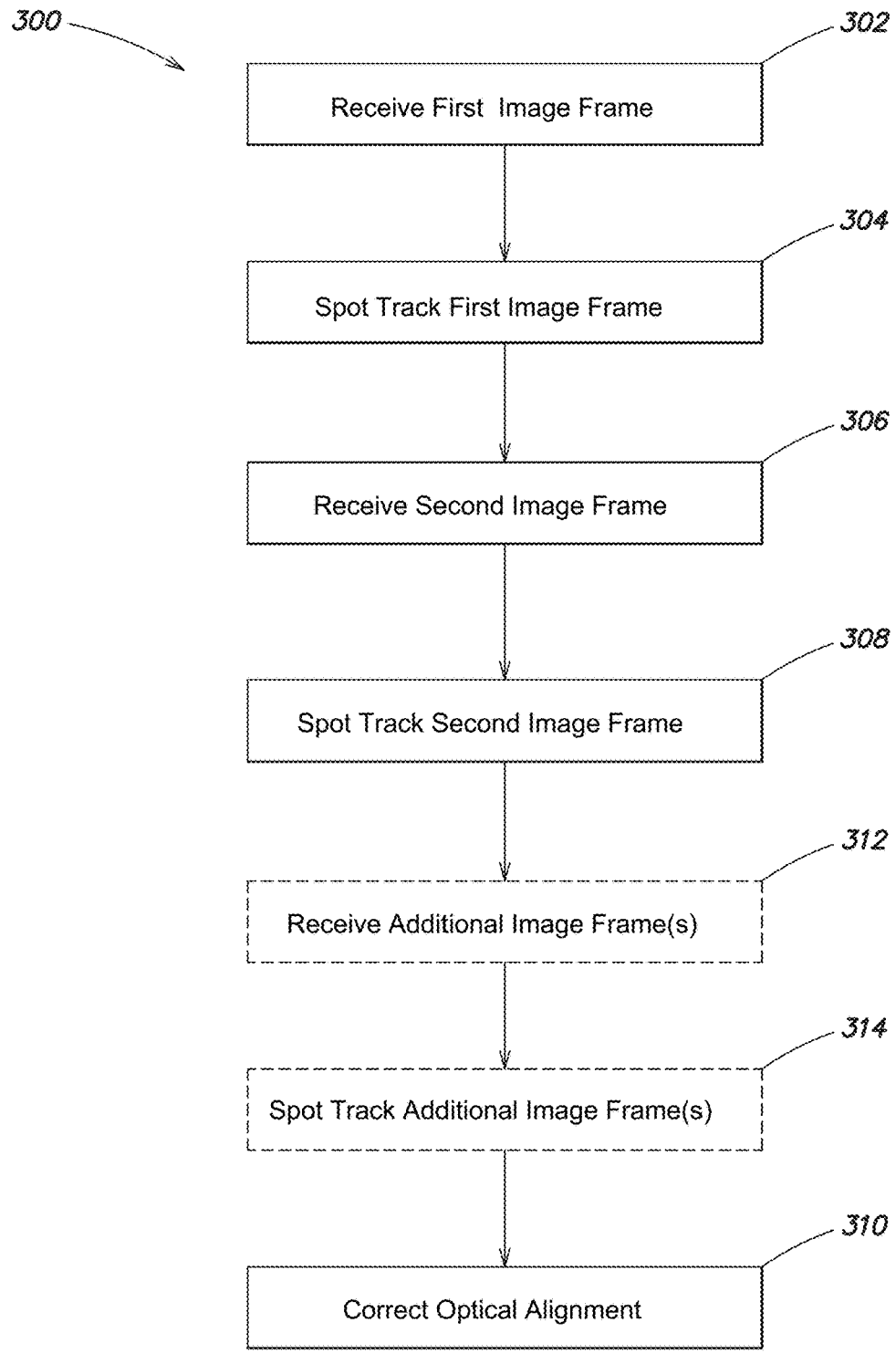
FIG. 3 is a process flow for operating an alignment system according to various examples described herein.

Referring now to FIG. 3, illustrated is one example of a multi-sensor boresight alignment method 300 for a reimaging optical system. Various acts of the method 300 described with reference to FIG. 3 may be performed by the example alignment system 102 or components of the reimaging optical system 100 shown in FIG. 1. Accordingly, FIG. 3 is described with continuing reference to FIG. 1. In various examples, the method 300 includes the acts of receiving a first image frame from the first imaging sensor 118, spot tracking the first image frame to identify a first centroid, receiving a second image frame from the second imaging sensor 120, spot tracking the second image frame to identify a second centroid, and correcting an optical alignment. While described with reference to a first image frame and a second image frame, it is appreciated that in various other examples the method 300 of FIG. 3 may be performed for more than two images frames. Accordingly, in certain examples, the method 300 may further include receiving additional image frames and spot tracking the additional image frames.

In act 302, the method 300 may include receiving a first image frame from the first imaging sensor 118, the first image frame having an image contrast within a first spectral band. In particular, the first image frame may include a first image of the alignment plate 126 positioned at the intermediate image plane 124 of the reimaging optical system 100. As described above, in various examples the alignment plate 126 has a pattern of apertures formed in a surface thereof. Specifically, the pattern of apertures may be formed in an optically reflective surface of the alignment plate 126 that is within a field of view of the first imaging sensor 118 and second imaging sensor 120 when the alignment plate 126 is positioned at the intermediate image plane 124. Accordingly, in various examples, the pattern of apertures of the alignment plate 126 is viewable within the first image of the alignment plate 126 when illuminated with optical illumination. In act 302, the method 300 may include receiving the first image frame from the first imaging sensor 118 at the system interface 106.

While not illustrated in FIG. 3, in various examples, the method 300 may include generating the first image frame at the first imaging sensor 118 prior to receiving the first image frame. In particular, the first imaging sensor 118 may generate one or more image frames of a continuous video stream based on the reflections of optical illumination from the reflective surface of the alignment plate 126, when the alignment plate 126 is positioned at the intermediate image plane 124. The first imaging sensor 118 may include an array of pixels that receive and accumulate charge corresponding to the flux of incident reflected optical illumination. The charge within each pixel is accumulated at a capacitive element which produces a voltage proportional to the accumulated charge (also referred to herein as a pixel light intensity level). The voltage corresponds to the intensity of the flux over a given time period (known as the integration period or the integration interval). The resulting voltage is conveyed by additional circuitry to an output of the first imaging sensor 118, and may be used to construct the first image frame.

Figure 4:
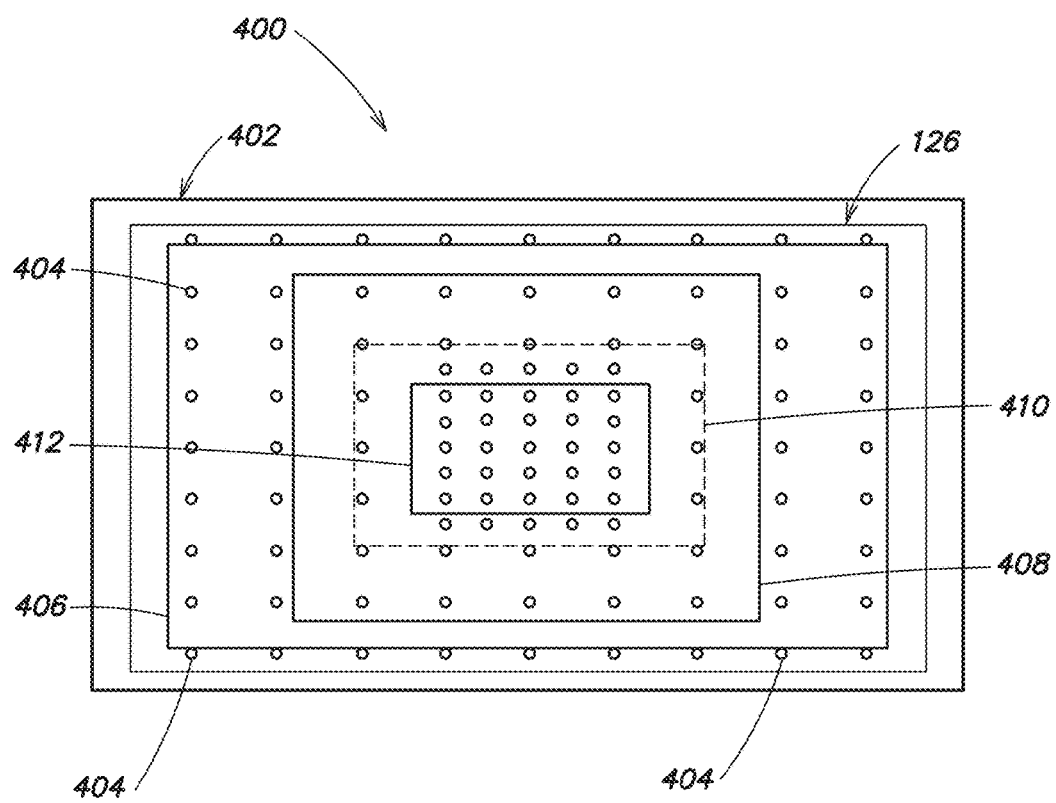
FIG. 4 is another image frame that includes an image of an alignment plate, according to various examples described herein.

In act 304, the method 300 may include spot tracking the first image frame to identify a first centroid of the pattern of apertures within the first image frame. While in one example, act 304 may include spot tracking the entire first image frame, in various other examples, act 304 may include spot tracking a subsection of the first image frame. Such an example may reduce the time necessary to identify the first centroid of the pattern of apertures and may also reduce the computational complexity of the method 300. For instance, briefly referring the FIG. 4, illustrated is one example of an image frame 400 that includes an image 402 of the alignment plate 126 and the corresponding pattern of apertures 404. Different subsections of the image frame 400 are indicated by boxes 406, 408, 410, 412. Accordingly, the subsections may be of variable size, and may be adjusted during the operation of the reimaging optical system 100.

Referring to act 304 in FIG. 3, in various examples "spot tracking" the first image frame includes searching a span of the first image frame, or a subsection of the first image frame, to locate a position of the centroid within the image frame, or locate a position of the centroid within the subsection of the first image frame. As discussed, in various examples the pattern of apertures includes a center aperture positioned at about a center of the reflective surface of the alignment plate 126. As such, in various examples, the location of the centroid of the pattern of apertures may correspond to the location of the center aperture of the pattern of apertures. As such, in various examples act 304 may include searching the span of the first image frame (or a subsection thereof) to locate a position of the center aperture within the first image frame (or subsection).

As further described herein, various acts may be performed to spot track the first image frame and to identify the centroid of the pattern of apertures (e.g., the center aperture). For instance, act 304 may include comparing a light intensity level of at least one pixel of the first image frame to a light intensity level threshold (or value) to locate the center aperture. As described above, in various examples the first imaging sensor 118 may include an array of pixels that each produce a voltage representative of the intensity of electromagnetic radiation received during imaging operations (referred to as pixel light intensity level). Each pixel light intensity level may be combined in an array to collectively generate the first image frame. As shown in FIG. 4, pixels that correspond to the apertures 404 of the alignment plate 126 appear brighter in the image frame 400 than the other areas of the image frame 400 (e.g., the other areas of the alignment plate 126). Accordingly, pixels that correspond to the apertures 404 have a higher pixel light intensity level relative to the other areas of the image 402.

Referring to FIG. 3, in various examples, the center aperture may have a larger diameter than the other apertures and, therefore, the pixel corresponding to the center aperture may have a pixel light intensity level different from the light intensity levels of the other pixels. Specifically, as a result of the larger diameter, the pixel corresponding to the center aperture may have a higher pixel light intensity level. Accordingly, in various examples, the pixel light intensity level of each pixel may be compared to a predetermined threshold level (or value) that is indicative of the expected response of a pixel that corresponds to the center aperture. When the threshold level is exceeded (or the predetermined value is met), the location of the matching pixel indicates the location of the center aperture within the first image frame. While described with reference to single pixels, it is appreciated that in various other examples more than one pixel may correspond to the location of the center aperture in the first image frame. Once the position of the center aperture has been determined, the centroid location is set to the location of the center aperture within the first image frame.

In certain other examples, spot tracking the first image frame may include locating the center aperture based at least in part on a diameter of the center aperture relative to a diameter of the other apertures of the pattern of apertures. As discussed above, the center aperture of the pattern of apertures may have a diameter larger than the diameter of the other apertures, which may all be the same. Accordingly, in various examples, act 304 may include analyzing the size (e.g., diameter) of each aperture within the first image frame to locate the aperture having a diameter different than the other apertures. Once this differing aperture has been located, the centroid of the pattern of apertures is set to the location of the differing aperture (i.e., the center aperture). In certain other examples, since the diameter of the center aperture is a constant known value, act 304 may include comparing a diameter of each aperture within the first image frame to the known value of the center aperture. Once a match between an aperture diameter within the first image and the known value of the center aperture has been confirmed, the centroid of the pattern of apertures is set to the location of the center aperture within the first image frame.

With continuing reference to FIG. 3, in act 306, the method 300 may include receiving a second image frame from the second imaging sensor 120, the second image frame having an image contrast within a second spectral band. In various examples, the second spectral band is spectrally distinct from the first spectral band. For instance, the first spectral band may include a portion of the optical infrared spectrum, and the second spectral band may include a portion of the thermal infrared spectral band. Similar to the first image frame, the second image frame may include a second image of the alignment plate 126 positioned at the intermediate image plane 124 of the reimaging optical system 100. Specifically, the pattern of apertures may be arranged in an optically reflective surface of the alignment plate 126 that is within a field of view of the second imaging sensor 120 when the alignment plate 126 is positioned at the intermediate image plane 124. Accordingly, in various examples, the pattern of apertures of the alignment plate 126 is viewable within the second image of the alignment plate 126. In act 306, the method 300 may include receiving the second image frame from the second imaging sensor 120 at the system interface 106. While not explicitly illustrated in FIG. 3, in various examples the method 300 may include the act of generating the second image frame at the second imaging sensor 120. Various acts similar to those described above with reference to the first imaging sensor 118 may be performed to generate the second image frame at the second imaging sensor 120.

In act 308, the method 300 may include spot tracking the second image frame to identify a centroid of the pattern of apertures within the second image frame. In various examples, "spot tracking" the second image frame includes acts similar to those discussed above for spot tracking the first image frame. In particular, act 308 may include searching a span of the second image frame, or a subsection of the second image frame, to locate a position of the centroid within the second image frame, or a position of the centroid within the subsection of the second image frame. In various examples, the centroid of the pattern of apertures within the second image frame corresponds to the center aperture of the pattern of apertures. Accordingly, the act of spot tracking the centroid of the pattern of apertures within the second image frame may include searching the span of the second image frame (or a subsection thereof) to locate a position of the center aperture within the second image frame (or subsection).

While in some examples, the second image frame may be spot tracked in the same manner as the first image frame (e.g., as discussed above with reference to at least act 304), in various other examples, different operations may be performed to spot track the second image frame. In one example, spot tracking the second image frame may include the act of comparing a pixel light intensity level of at least one pixel of the second image frame to a pixel light intensity level threshold to locate the center aperture within the second subsection. In other examples, act 308 may include locating the center aperture within the second image frame based at least in part on the diameter of the center aperture relative to the diameter of the other apertures of the pattern of apertures.

In act 310 the method 300 may include correcting an optical alignment between the first imaging sensor 118 and the second imaging sensor 120 based at least in part on a position of the first centroid within the first image frame and a position of the second centroid within the second image frame. In various examples, correcting an optical alignment between the first imaging sensor 118 and the second imaging sensor 120 includes reducing an offset between a center of a field of view of the first imaging center and a center of a field of view of the second imaging center. That is, in various examples correcting an optical alignment between the imaging sensors 118, 120 includes co-aligning the first imaging sensor 118 and the second imaging sensor 120.

In various examples, act 310 includes aligning an image center of the first image frame to the position of the first centroid, and aligning the image center of the second image frame to the position of the second centroid. Since the first and second centroids are fixed relative to the alignment plate 126, alignment of the first and second image centers to the first and second centroids, respectively, ensures that the first and second imaging sensor 118, 120 are co-aligned. In various examples, such acts may include adjusting one or more optical components of the reimaging optical system 100 to adjust a positional offset between the first image center and the first centroid and/or the second image center and the second centroid. For instance, the FPGA 104 may provide a control signal to the reimaging optical element 122 and/or one or both of the focusing optics 116a, 116b to adjust a direction or angle at which the first imaging sensor 118 or second imaging sensor 120 receive electromagnetic radiation. In certain other examples, the FPGA 104 may provide one or more control signals to an actuator or other positioning mechanism that is configured to adjust a position of the first imaging sensor 118 and/or the second imaging sensor 120. That is, in various examples act 310 may include directly adjusting a position of the first imaging sensor 118 and/or the second imaging sensor 120.

In still other examples, act 310 may include one or more image processing operations that substantially align the center of the first image with the first centroid, and substantially align a center of the second image with the second centroid. For instance, the FPGA 104 may be configured to execute one or more pixel substation operations to reduce a pixel offset between the respective image center and the respective centroid.

For example, FIGS. 5A and 5B provide an illustrative example of the first image frame during one or more acts performed to align the image center of the first image frame with the first centroid. In particular, FIG. 5A illustrates a simplified image 500 of the first image frame including a pattern of five apertures 502. Notably, in FIGS. 5A and 5B the centroid of the pattern of apertures is indicated by box 504, which is co-aligned with the center aperture 506. The image center is represented in FIGS. 5A and 5B by hash marks 508. In various examples, the method 300 includes determining the image center of the first image frame based on the dimensions of the first image frame. As shown in FIGS. 5A and 5B, the first image frame may be repositioned such that the positional offset between the image center and the first centroid is reduced, and the image center and the first centroid are substantially centered. FIG. 5B illustrates an example of the image center and the first centroid centered.

FIG. 6A illustrates a simplified image 600 of the second image frame. Similar to the simplified image 500 of the first image frame, the pattern of apertures in the second image frame is simplified as an arrangement of five apertures 602. The centroid of the pattern of apertures is indicated by box 604, which is co-aligned with the center aperture 606. The image center is represented in FIGS. 6A and 6B by hash marks 608. In various examples, the method 300 includes determining the image center of the second image frame based on the dimensions of the second image frame. As shown in FIGS. 6A and 6B, the second image frame may be repositioned such that the positional offset between the image center and the second centroid is reduced, and the image center and the second centroid are substantially centered. FIG. 6B illustrates an example of the image center and the second centroid centered.

While in various examples, the method 300 illustrated in FIG. 3 may include one or more acts of correcting an optical alignment between the first imaging sensor 118 and the second imaging sensor 120, in various other examples, based on the centroid position within each image frame, the method 300 may further or alternatively include one or more acts of correcting an optical distortion of one or both of the imaging sensors 118, 120. As previously discussed, each optical path within a multi-spectral electro-optical system often has a relative level of optical distortion. In various examples, the method 300 includes one or more acts of correcting this distortion. These acts may include universally applying a single positional correction to an entire image frame of each imaging sensor (e.g., the first imaging sensor 118 and/or the second imaging sensor 120), or matching sensed distortion through an alignment of distortion that varies spatially across each image frame. In particular, measurements of the pattern of apertures spatially distributed across a respective image frame may expose variations in a positional offset across that image frame.

While FIG. 3 is described with reference to only two imaging sensors, in various examples, the method 300 may be executed for any number of imaging sensors within a multi-spectral optical system. Accordingly, FIG. 3 is illustrated as including optional acts 312 and 314. In act 312, the method 300 may include receiving one or more additional image frames from one or more additional imaging sensors. Each addition image frame includes an image contrast within an additional spectral band and may include another image of the alignment plate 126 positioned at the intermediate image plane 124. In act 314, the method 300 may include spot tracking the one or more additional image frames to identify a centroid of the pattern of apertures within that respective image frame. Various examples of acts performed during the spot tracking steps of act 314 are described above with reference to act 304 and/or act 308. Accordingly, in these examples 310 may include correcting an optical alignment of the first imaging sensor 118, the second imaging sensor 120, and the one or more additional imaging sensors.

Figure 7A:
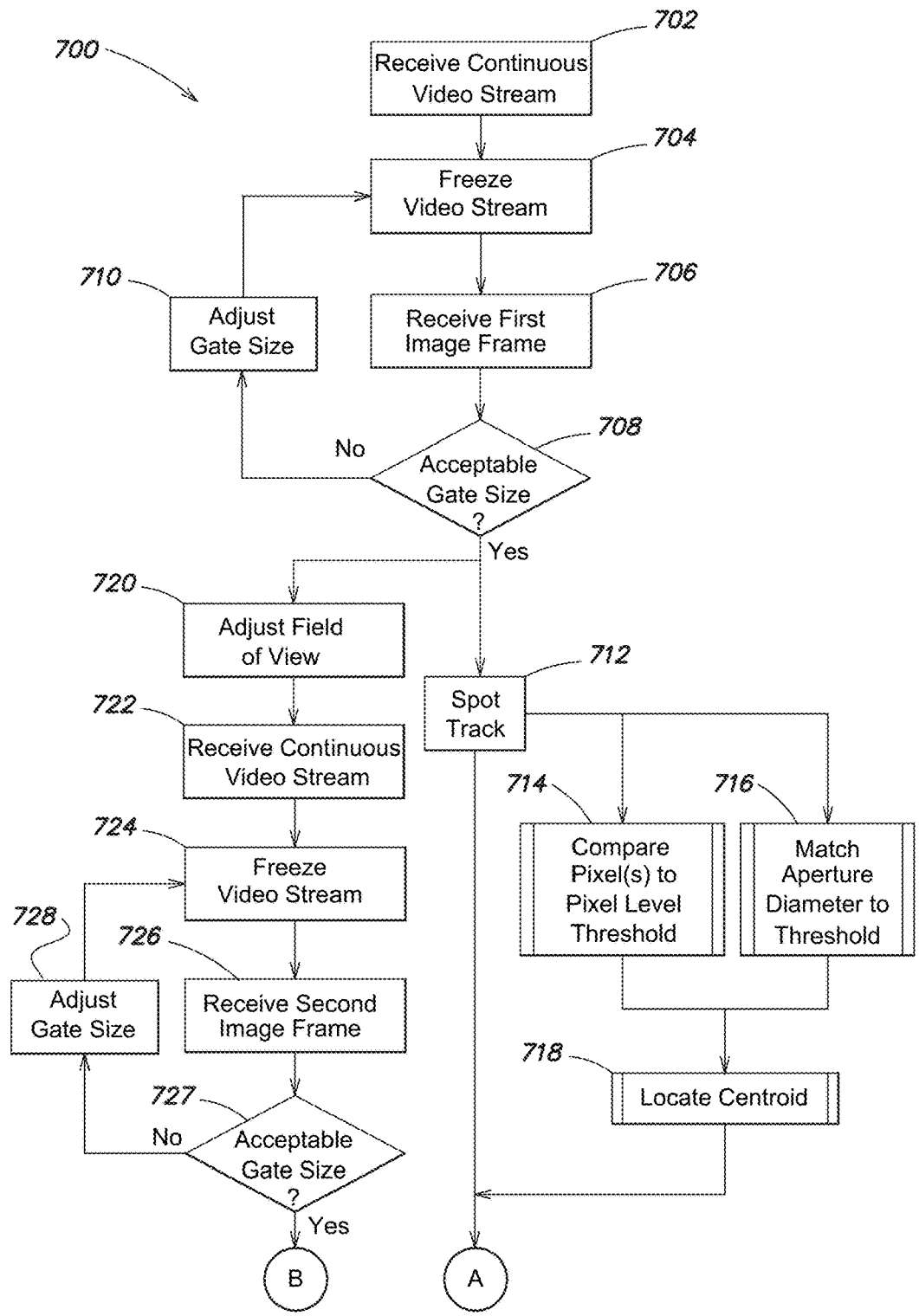
FIGS. 7A-7B are flow diagrams illustrating a more detailed process flow for operating an alignment system according to various examples described herein.
Figure 7B:
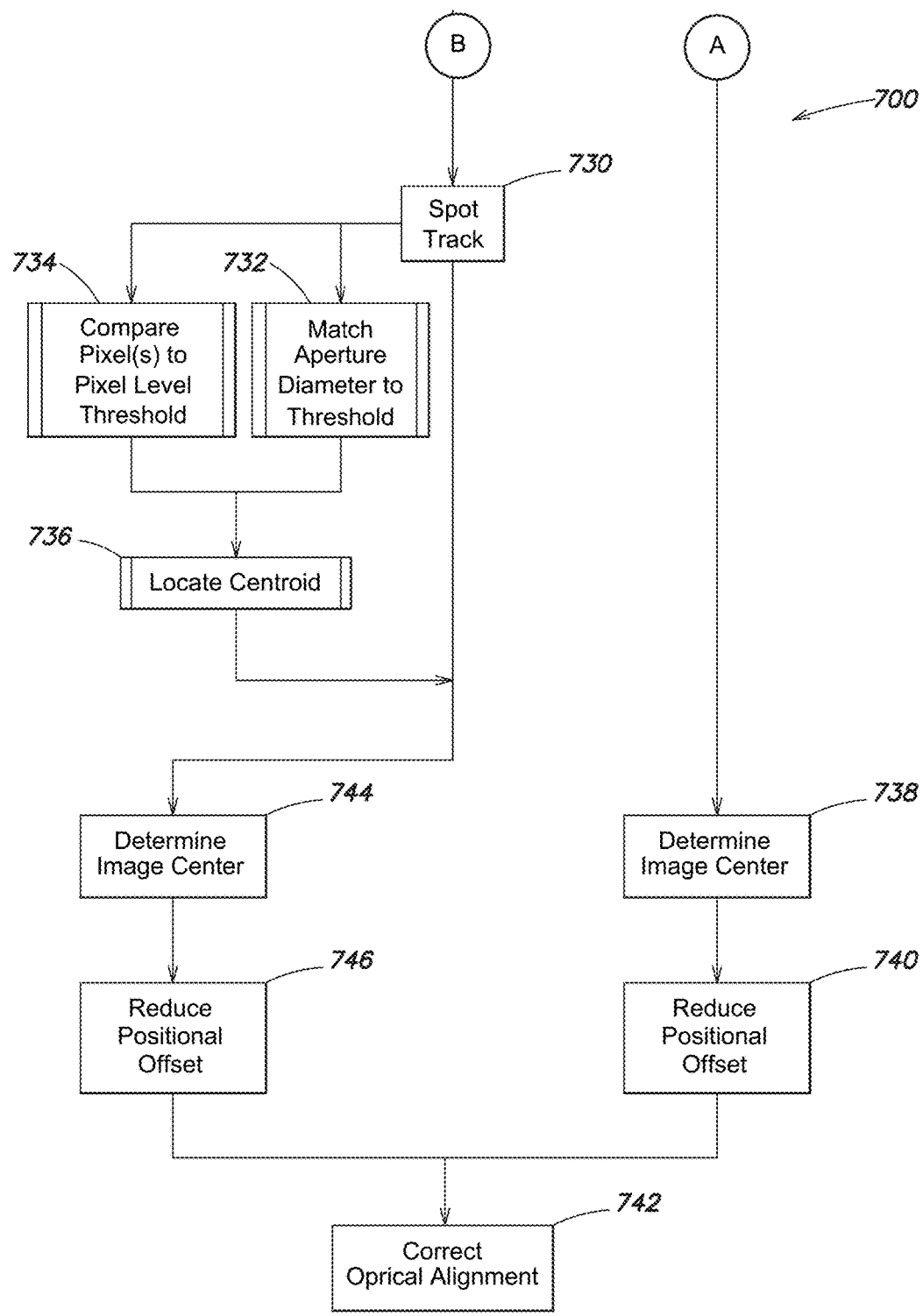

While not explicitly illustrated in FIG. 3, the method 300 may include various other acts and sub-acts. FIGS. 7A-7B illustrates a more detailed process flow of a multi-sensor boresight alignment method 700 for a reimaging optical system. Various acts and steps of the method 700 described with reference to FIGS. 7A-7B may be performed by the example multi-sensor boresight alignment system 102 of the reimaging optical system 100 illustrated in FIG. 1. Accordingly, FIGS. 7A-7B is described with continuing reference to FIG. 1. However, FIGS. 7A-7B is merely illustrative, and in various other examples the acts and steps of FIGS. 7A-7B may be implemented by the control system of other types of optical system.

In act 702, the method 700 may include receiving a continuous video image stream from the first imaging sensor 118. In particular, the continuous video image stream may include a video stream of the alignment plate 126 when positioned at the intermediate image plane 124. Accordingly, each image frame of the video image stream may include an image of the alignment plate 126 and the plurality of apertures formed therein. In act 704, the method 700 may include freezing the continuous video image stream, and in act 706 the method 700 may include retrieving a single image frame of the continuous video image stream. As discussed with reference to FIG. 3, in various examples spot tracking and alignment procedures may be performed on one or more subsections of an image frame to increase speed and efficiency of spot tracking procedures.

Accordingly, in one example the method 700 includes obtaining a subsection of the first image frame. For instance, instead of receiving the full first image frame, in various examples act 706 may include receiving a subsection of the first image frame. In such an example, the method 700 may include comparing a gate size of the first image frame subsection to a gate size threshold (act 708). The gate size threshold may be a predefined value that is set at a level that ensures that a size of the first image frame subsection is suitable for the alignment acts further described herein. In various examples, "gate size" refers to the number of image pixels observable in the image frame. For example, the gate size threshold may be set to a size of 256 by 256 16-bit pixels. However, the particular value of the gate size threshold may vary based on the particular optical system, desired resolution, and imaging sensor configuration. If the expected gate size is not matched (e.g., too few pixels or too many pixels are observable in the subsection of the first image), the method 700 may include adjusting the gate size (act 710) and re-freezing the continuous video image stream (act 704) to obtain another first image frame (act 706).

However, if the gate size matches the gate size threshold, or is within a tolerance range (e.g., 3%) of the gate size threshold, the method 700 proceeds to act 712. In act 712, the method 700 may include spot tracking the first image frame to identify a first centroid of the pattern of apertures within the first image frame. Some examples of spot tracking are described above with reference to act 304 of the method 300 illustrated in FIG. 3. While in one example, act 712 may include spot tracking the entire first image frame, in various other examples, act 712 may include spot tracking a subsection of the first image frame. As shown, in various examples, act 712 may include one or more sub-acts.

For example, in some examples spot tracking the first image frame to identify the first centroid of the pattern of apertures within the first image frame may include comparing a pixel light intensity level of at least one pixel of the first image frame to a pixel light intensity level threshold (act 714). In various examples, the centroid of the pattern of apertures may correspond to the center aperture of the pattern of apertures. The center aperture of the pattern of apertures may have a diameter larger than the other apertures of the pattern. Accordingly, the pixel or pixels that correspond to the center aperture may have a pixel light intensity level different from the pixel light intensity levels corresponding to the other pixels of the first image frame. Specifically, as a result of the larger diameter, the pixel or pixels corresponding to the center aperture may have a higher pixel light intensity level. Accordingly, in various examples, the pixel light intensity level of each pixel may be compared to a threshold level indicative of the expected response of a pixel corresponding to the center aperture. When the threshold level is exceeded, it is indicative of the presence of the center aperture. In various examples, the position of the first centroid is determined based on the position of the center aperture. In particular, in act 718 the method 700 may include setting the location of the first centroid to the location of the center aperture within the first image frame.

In certain other examples, spot tracking the first image frame may include analyzing the size (e.g., diameter) of each aperture within the first image frame (act 716). In particular, the method 700 may include comparing the size of each aperture within the pattern of apertures of the first image frame to a predetermined aperture size threshold or value. Since the diameter of the center aperture is a constant known value (e.g., the diameter of the center aperture does not change), act 716 may include comparing the size of each aperture in the first image frame to the known value of the center aperture. Once a match between an aperture diameter within the first image frame and the known value has been confirmed, the centroid of the pattern of apertures in the first image is set to the location of the center aperture (act 718). While FIG. 7A illustrates a few examples of acts that may be performed to locate the centroid of the pattern of apertures within the first image frame, in various other examples, other image processing operations may be performed to locate the centroid.

As shown in FIG. 7A, once a first image frame has been received and spot tracking operations for the first image frame have been initiated, the reimaging optical system no longer needs a continuous video image stream of the alignment plate from the first imaging sensor. Accordingly, in various examples, the method may include adjusting a field of view (or focus) of the second imaging sensor 120 to correspond to the dimension of the alignment plate 126 (act 720) while the spot tracking operations for the first image frame (act 712) are performed. That is, in various examples, the method 700 may include controlling a position of one or more optical components of the reimaging optical imaging system 100 such that the alignment plate 126 is within the field of view of the second imaging sensor 120. In various examples, act 720 may include repositioning the reimaging optical element 122 and/or the more focusing optic 116*b* to expand or narrow the field of view of the second imaging sensor 120 such that the alignment plate 126 is positioned within the field of view and within a focus of the second imaging sensor 120. Accordingly, in certain examples the method 700 may include the acts of adjusting one or more optical components to facilitate imaging operations performed by the second imaging sensor 120 while simultaneously performing spot tracking operations on an image frame generated by a different imaging sensor (e.g., the first imaging sensor 118).

In act 722, the method 700 may then include receiving a continuous video image stream from the second imaging sensor 120. In particular, the continuous video image stream may include a continuous video stream of the alignment plate 126 positioned at the intermediate image plane 124. Accordingly, each image frame of the video image stream may include an image of the alignment plate 126 and the pattern of apertures formed therein. In act 724, the method 700 may include freezing the continuous video image stream provided by the second imaging sensor 120, and in act 726, the method 700 may include retrieving a second image frame of the continuous video image stream. As discussed with reference to FIG. 3, in various examples spot tracking and alignment procedures may be performed on one or more subsections of the second image frame to increase speed and efficiency of the spot tracking operations. In such an example, the method 700 may include comparing a gate size of a second image frame subsection to a gate size threshold (act 727), and increasing or decreasing the gate size (act 728) if the gate size is not within a tolerance range of the gate size threshold (e.g., too few pixels or too many pixels are observable in the subsection of the first image).

In act 730, the method 700 may include spot tracking the second image frame to identify a second centroid of the pattern of apertures within the second image frame. In various examples, act 730 includes performing spot tracking actions similar to those discussed above with reference to act 712 and sub-acts 714 and 716. While in one example, act 730 may include spot tracking the entire second image frame, in various other examples, act 730 may include spot tracking a subsection of the second image frame. As shown, in various examples, act 730 may include sub-acts 734 and 732. In sub-act 734, the method 700 may include comparing a pixel light intensity level of each pixel of the second image frame (or subsection thereof) to a threshold level indicative of the expected response of a pixel corresponding to the center aperture. When the threshold level is exceeded, it is indicative of the location of the center aperture. In various examples, the position of the first centroid is determined based on the position of the center aperture. In particular, in act 736, the method 700 may include setting the location of the first centroid to the location of the center aperture within the first image frame.

In sub-act 732, spot tracking the second image frame may include analyzing the size (e.g., diameter) of each aperture of the pattern of apertures as imaged in the second image frame. In particular, the method 700 may include comparing the size of each aperture within the pattern of apertures of the second image frame to a predetermined aperture size threshold or value. Since the diameter of the center aperture is a constant known value (e.g., the diameter of the center aperture does not change), act 732 may include comparing the size of each aperture in the first image frame to the known value of the center aperture. Once a match between an aperture diameter within the second image frame and the known value has been confirmed, the centroid of the pattern of apertures in the second image frame is set to the location of the center aperture (act 736). While FIG. 7A illustrates a few examples of acts that may be performed to locate the centroid of the pattern of apertures within the first image frame, in various other examples, other image processing operations may be performed to locate the centroid.

Once the centroid of the pattern of apertures within the first image frame and the centroid of the pattern of apertures within the second image frame have each been located, the method 700 may include determining an image center of each of the first image frame and the second image frame (acts 744 and 738). In various examples, the center of each image frame may be determined based on the dimensions of the respective image frame (or gate). For instance, an apparent length and width of each image frame (or gate) may be used to ascertain the image center of each frame (or gate). In act 740, the method 700 may include reducing a first positional offset between the first image center of the first image frame and the first centroid, and in act 746 the method 700 may include reducing a second positional offset between the second image center of the second image frame and the second centroid. That is, in various examples the method 700 may include aligning the image center of the first image frame to the first centroid, and aligning the image center of the second image frame to the second centroid. Since the first and second centroid are fixed relative to the alignment plate, alignment of the first and second image centers to the first and second centroids, respectively, ensures that the first and second imaging sensor are co-aligned (act 742).

In various examples, acts 740 and 746 may include adjusting one or more optical components of the reimaging optical system to adjust a positional offset between the first image center and the first centroid and the second image center and the second centroid. For instance, the method 700 may include providing a control signal to the reimaging optical element 122 and/or one or both of the focusing optics 116a, 116b to adjust a direction or angle at which the first imaging sensor 118 or second imaging sensor 120 receive electromagnetic radiation. In certain other examples, the FPGA 104 may provide one or more control signals to an actuator or other positioning mechanism that is configured to adjust a position of the first imaging sensor 118 and/or the second imaging sensor 120. That is, in various examples acts 740 and 746 may include directly adjusting a position of the first imaging sensor 118 and/or the second imaging sensor 120.

In still other examples, acts 740 and 746 may include one or more image processing operations that substantially align the center of the first image with the first centroid, and substantially align a center of the second image with the second centroid of the second image. For instance, the method may include executing one or more pixel substation operations at the FPGA 104 to reduce a pixel offset from the respective image center and the respective centroid.

Accordingly, various examples of the multi-spectral boresight alignment systems and methods described herein provide for rapid real-time optical sensor alignment correction and/or distortion correction. Particular examples of the described alignment system may be self-contained within a multi-spectral electro-optical system to permit rapid real-time optical sensor alignment correction and/or distortion correction during the deployment of the associated multi-spectral electro-optical system. Accordingly, various aspects and embodiments of the multi-spectral boresight alignment systems and methods described herein provide sensor alignment and distortion correction functionality that is not currently offered by existing optical devices and imaging techniques.

Having described above several aspects of at least one example, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multi-sensor boresight alignment method for a reimaging optical system, the method comprising:
receiving a first image frame from a first imaging sensor, the first image frame having an image contrast within a first spectral band and including a first image of a plate positioned at an intermediate image plane of the reimaging optical system, the plate having a pattern of apertures arranged in a surface thereof;

spot tracking the first image frame to identify a first centroid of the pattern of apertures within the first image frame;

receiving a second image frame from a second imaging sensor, the second image frame having an image contrast within a second spectral band and including a second image of the plate;

spot tracking the second image frame to identify a second centroid of the pattern of apertures within the second image frame; and correcting an optical alignment between the first imaging sensor and the second imaging sensor based at least in part on a position of the first centroid within the first image frame and a position of the second centroid within the second image frame.

2. The method of claim 1, wherein spot tracking the first image frame includes spot tracking a first subsection of the first image frame and wherein spot tracking the second image frame includes spot tracking a second subsection of the second image frame.

3. The method of claim 2, wherein each of the first centroid and the second centroid corresponds to a center aperture of the pattern of apertures, the center aperture being disposed at substantially a center of the plate.

4. The method of claim 3, wherein spot tracking the first image frame to identify the first centroid includes comparing a light intensity level of at least one pixel of the first image frame to a light intensity level threshold to locate the center aperture within the first subsection, and wherein spot tracking the second image frame to identify the second centroid includes comparing a light intensity level of at least one pixel of the second image frame to the light intensity level threshold to locate the center aperture within the second subsection.

5. The method of claim 3, wherein spot tracking the first image frame to identify the first centroid includes locating the center aperture within the subsection frame based at least in part on a diameter of the center aperture relative to a diameter of the other apertures of the pattern of apertures, and wherein spot tracking the second image frame to identify the second centroid includes locating the center aperture within the second subsection based at least in part on the diameter of the center aperture relative to the diameter of the other apertures of the pattern of apertures.

6. The method of claim 1, further comprising determining a first image center of the first image frame and a second image center of the second image frame.

7. The method of claim 6, wherein correcting the optical alignment between the first imaging sensor and the second imaging sensor includes:
reducing a first positional offset between the first image center of the first image frame and the first centroid; and
reducing a second positional offset between the second image center of the second image frame and the second centroid.

8. The method of claim 1, wherein the first image frame is a first single image frame from a continuous first video image stream, and wherein the second image frame is a second single image frame from a continuous second video image stream.

9. The method of claim 8, further comprising adjusting a field of view of the second imaging sensor to correspond to dimensions of the plate while spot tracking the first image frame.

10. The method of claim 9, wherein the first spectral band is at least one of the visible and near-infrared (VNIR) spectral band and the short-wavelength infrared (SWIR) spectral band, and wherein the second spectral band is at least one of the mid-wavelength infrared (MWIR) spectral band, the long-wavelength infrared (LWIR) spectral band, the very long wavelength infrared (VLWIR) spectral band, and the far infrared (FIR) spectral band.

11. A multi-sensor boresight alignment system comprising:
a system interface component configured to receive a first image frame from a first imaging sensor and a second image frame from a second imaging sensor, the first image frame having an image contrast within a first spectral band and including a first image of a plate having a pattern of apertures arranged in a surface thereof, and the second image frame having an image contrast within a second spectral band and including a second image of the plate having the pattern of apertures; and
at least one field programmable gate array coupled to the system interface component, the field programmable gate array being configured to:
spot track the first image frame to identify a first centroid of the pattern of apertures within the first image frame,
spot track the second image frame to identify a second centroid of the pattern of apertures within the second image frame, and
correct an optical alignment between the first imaging sensor and the second imaging sensor based at least in part on a position of the first centroid within the first image frame and a position of the second centroid within the second image frame.

12. The multi-sensor boresight alignment system of claim 11, wherein in spot tracking the first image frame the field programmable gate array is configured to spot track a first subsection of the first image frame, and wherein in spot tracking the second image frame the field programmable gate array is configured to spot track a second subsection of the second image frame.

13. The multi-sensor boresight alignment system of claim 12, wherein each of the first centroid and the second centroid corresponds to a center aperture of the pattern of apertures, the center aperture being disposed at substantially a center of the plate.

14. The multi-sensor boresight alignment system of claim 13, wherein the field programmable gate array is configured to compare a light intensity level of at least one pixel of the first image frame to a light intensity level threshold to locate the center aperture within the first subsection, and wherein the field programmable gate array is configured to compare a light intensity level of at least one pixel of the second image frame to the light intensity level threshold to locate the center aperture within the second subsection.

15. The multi-sensor boresight alignment system of claim 11, wherein the field programmable gate array is further configured to determine a first image center of the first image frame and a second image center of the second image frame.

16. The multi-sensor boresight alignment system of claim 15, wherein in correcting the optical alignment between the first imaging sensor and the second imaging sensor the field programmable gate array is configured to:

reduce a first positional offset between the first image center of the first image and the first centroid; and reduce a second positional offset between the second image center of the second image and the second centroid.

17. The multi-sensor boresight alignment system of claim 11, wherein the first image frame is a first single image frame from a continuous first video image stream, and wherein the second image frame is a second single image frame from a continuous second video image stream.

18. The multi-sensor boresight alignment system of claim 11, further comprising:

the first imaging sensor, the first imaging sensor being configured to generate at least the first image frame having the image contrast within the first spectral band, wherein the first imaging sensor is positioned at a first focal plane; and the second imaging sensor, the second imaging sensor being configured to generate at least the second image frame having the image contrast within the second spectral band, wherein the second imaging sensor is positioned at a second focal plane.

19. The multi-sensor boresight alignment system of claim 18, further comprising at least one focusing optic interposed between the first imaging sensor and the intermediate image plane, and interposed between the second imaging sensor and the intermediate image plane, wherein the field programmable gate array is further configured to control the at least one focusing optic to adjust a field of view of the second imaging sensor to correspond to dimensions of the plate, while spot tracking the first image frame.

20. The multi-sensor boresight alignment system of claim 19, wherein the first spectral band is at least one of the visible and near-infrared (VNIR) spectral band and the short-wavelength infrared (SWIR) spectral band, and wherein the second spectral band is at least one of the mid-wavelength infrared (MWIR) spectral band, the long-wavelength infrared (LWIR) spectral band, the very long wavelength infrared (VLWIR) spectral band, and the far infrared (FIR) spectral band.

* * * * *